INVENTOR.
B. W. LERCH
BY
ATTORNEY

April 7, 1959  B. W. LERCH  2,880,642
CORE COVERING APPARATUS
Filed Feb. 9, 1956  3 Sheets-Sheet 2

INVENTOR.
B. W. LERCH
BY
ATTORNEY

April 7, 1959 B. W. LERCH 2,880,642
CORE COVERING APPARATUS
Filed Feb. 9, 1956 3 Sheets-Sheet 3
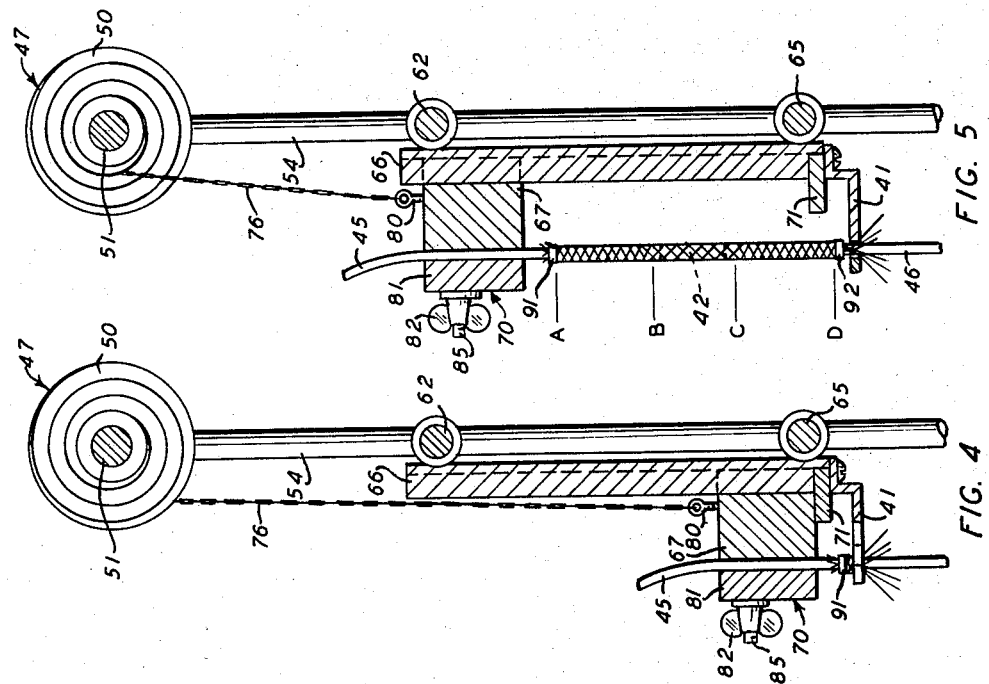
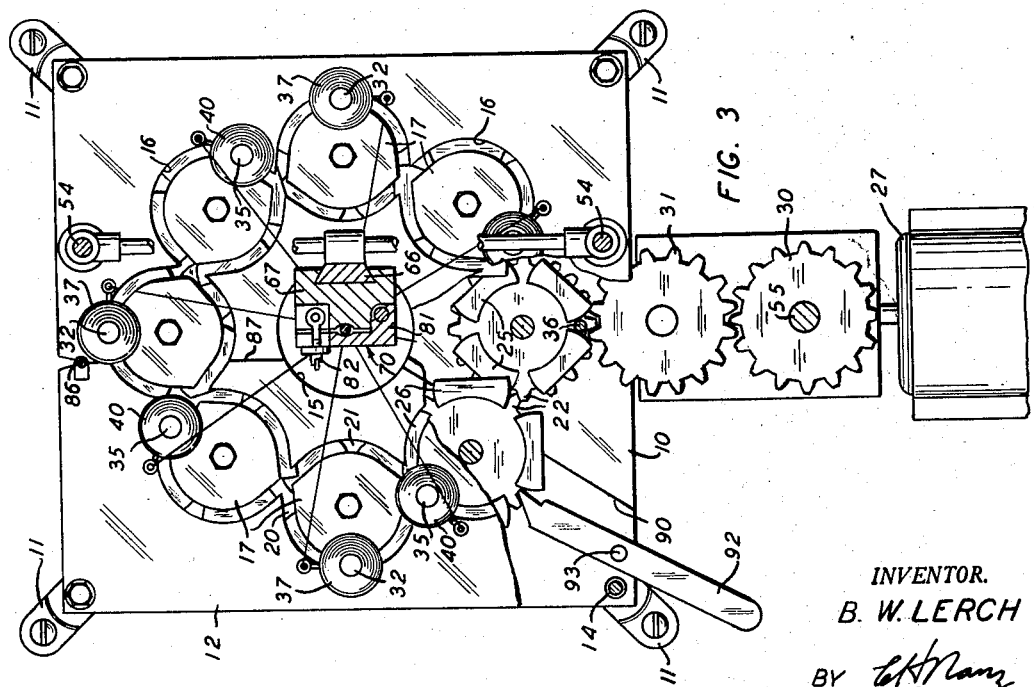
INVENTOR.
B. W. LERCH
BY [signature]
ATTORNEY sect at a plurality of positions.

2,880,642

CORE COVERING APPARATUS

Brooke W. Lerch, Stoneleigh, Md., assignor to Western Electric Company, Incorporated, New York, N.Y., a corporation of New York Application February 9, 1956, Serial No. 564,453

8 Claims. (Cl. 87—44)

This invention relates to core covering apparatus, and more particularly to apparatus for covering a splice in electrical conductors.

In the manufacture of electrical cables, it is often necessary to splice the conductors at the trailing end of one cable to the conductors at the leading end of a second cable. Usually, the splice is made and the splice is covered with material to insulate the conductors in the cable electrically. If tensile forces are applied to the spliced cables, the cables will possibly be pulled apart, or at least the splice between the cables will be weakened. Heretofore, several devices have been provided to prevent tension in the cables from weakening the splice therebetween, but these have been difficult to apply to the cables.

An object of the invention is to provide a new and improved core covering apparatus.

Another object of the invention is to provide a new and improved apparatus for covering a splice between electrical conductors.

A further object of the invention is to provide a new and improved apparatus for applying a variable-lay braid over a splice in a cable so that the splice will not present a weakened area in the splice cable.

A core covering apparatus illustrating certain features of the invention may include a plurality of strand supplies, means for revolving the strand supplies around a core to form the strands into a braided covering on the core and means for advancing the core at variable speeds to vary the angle of lay of the strands in the braid.

A complete understanding of the invention may be obtained from the following detailed description of a core covering apparatus forming a specific embodiment thereof, when read in conjunction with the appended drawings, in which:

Fig. 3 is a horizontal section taken along line 3—3 of Fig. 2;

Fig. 4 is an enlarged, vertical section taken along line 4—4 of Fig. 1 showing parts of the core covering apparatus at the beginning of a covering operation, and Fig. 5 is a vertical section similar to Fig. 4 showing the apparatus at the end of the covering operation.

Figure 1:
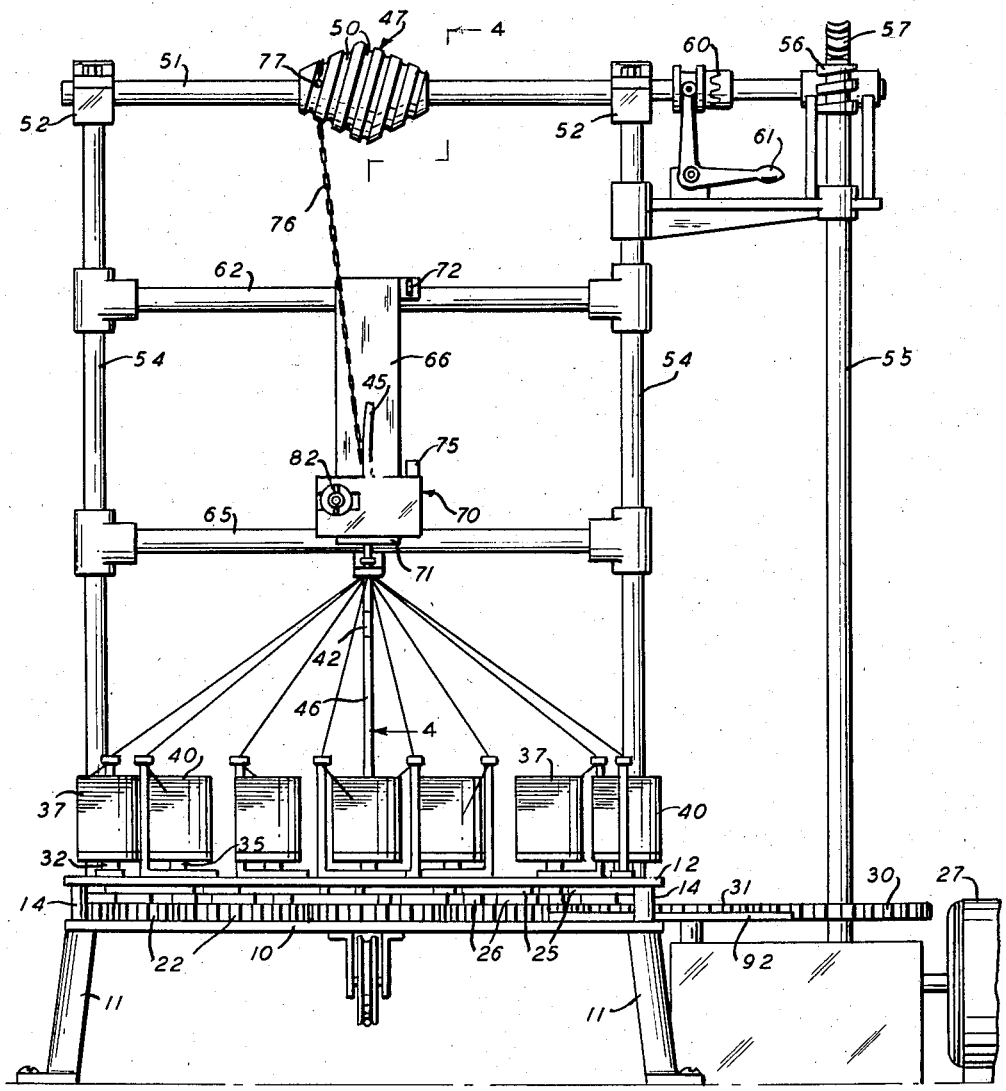
Fig. 1 is a front elevation of a core covering apparatus embodying the invention.
Figure 2:
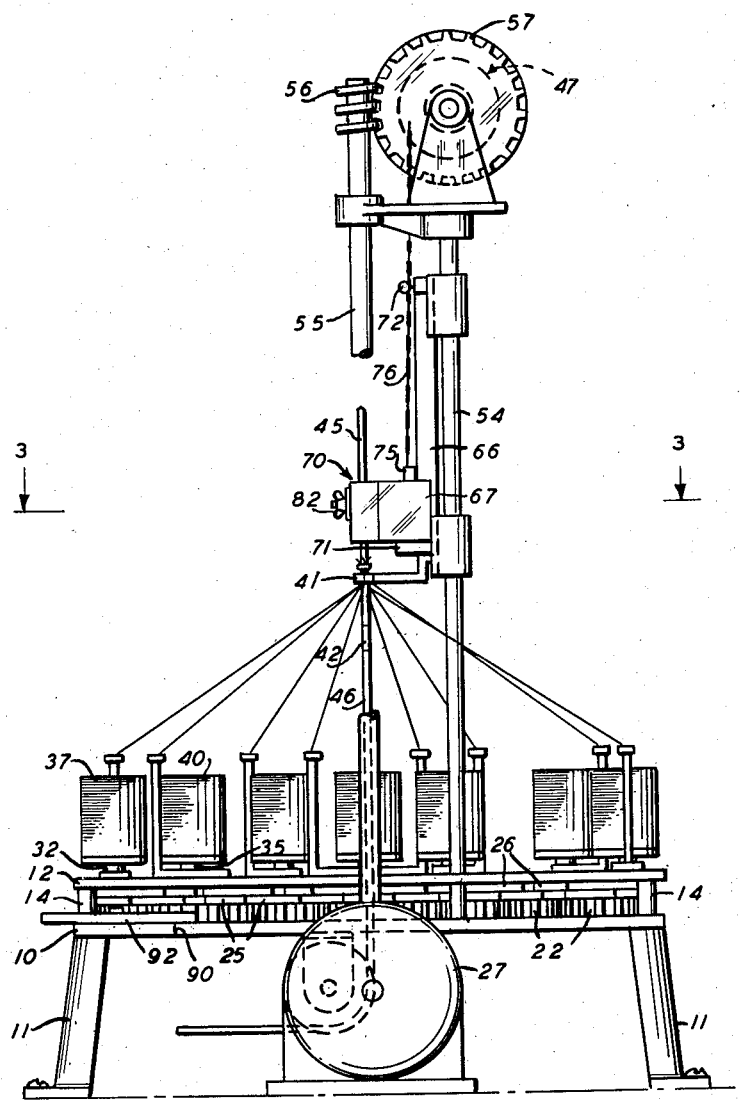
Fig. 2 is a side elevation, with parts thereof broken away, of the apparatus shown in Fig. 1.

Referring now to Figs. 1, 2 and 3, a core covering apparatus is shown in which the lower portion is constructed like a conventional braiding machine. A bottom plate 10 is supported on a plurality of legs 11—11, and a top plate 12 is secured a fixed distance above the bottom plate 10 by spacers 14—14. Each of the plates 10 and 12 has a circular aperture 15 formed centrally therethrough. The top plate 12 has a plurality of substantially circular slots 16—16 cut therethrough in each of which a quoit 17 is secured. The surfaces of the quoits 17—17 are flush with the surfaces of the top plate 12 and, in effect, the quoits form a part of the top plate 12. The slots 16—16 in the top plate 12 and the quoits 17—17 positioned therein define two continuous grooves 20 and 21 in the top plate, which grooves intersect at a plurality of positions.

Gears 22—22 (Fig. 3) are mounted rotatably upon the bottom plate 10, with one of the gears positioned below each of the quoits 17—17. The gears 22—22 are arranged in a circle between the top plate 12 and the bottom plate 10 so that each gear meshes with the gear adjacent thereto and rotates in an opposite direction. Also, adjacent gears 22—22 have horns 25—25 and 26—26 secured fixedly to the upper sides thereof so as to comprise horn gears. The horns 25—25 are on a level lower than that of the adjacent horns 26—26 so that the lower horns may pass under the upper horns. The horns are so positioned that the spaces between the horns are adjacent to each other when the driving gears and the horn gears are rotated. Rotation is imparted to the gears 22—22 by a motor 27 through gears 30 and 31, the latter of which meshes with one of the gears 22—22.

A plurality of bobbin carries 32—32 and 35—35 are mounted for slidable movement within the grooves 20 and 21, respectively. The lower end of each carrier includes a spindle, one of which is shown at 36 in Fig. 3, that extends through the groove 20 or 21 and into a space which is below the grooves and between two adjacent horns 25—25 or 26—26. Bobbins 37—37 and 40—40 of stranded material, such as strong metal strands, are mounted upon the carriers 32—32 and 35—35, respectively.

As described hereinabove, adjacent driving gears 22—22 and the horns 25—25 and 26—26 are driven in opposite directions. Because of this construction, if the spindles at the lower ends of the carriers 32—32 and 35—35 are so positioned in the spaces between the horns 25—25 and 26—26, substantially as shown in Fig. 3, the bobbins 37—37 will be carried in one direction around the groove 20 and the bobbins 40—40 will be carried in the opposite direction around the groove 21. A former 41 is secured fixedly above the plates 10 and 12. Referring to Figs. 4 and 5, the former 41 consists of a ring having an axis coincident with the axes of the plates 10 and 12. The ring may be hinged so that it can be opened along a diameter thereof.

So far, a conventional braiding machine has been described. If a core, such as an electrical cable, were passed upwardly through the central apertures 15—15 in the plates 10 and 12 and through the former 41, and the motor 27 were energized to revolve the bobbins 37—37 and 40—40 in opposite directions around the core axis, the bobbins would pass around one another in such a manner that a braid would be formed around the core. In a conventional apparatus of this design, a capstan or some other suitable mechanism generally is provided for advancing the core through the apparatus in timed relation with the revolving of the bobbins therearound. With this structure, a braid having a constant lay would be obtained, that is, the strands from the bobbins are laid around the advancing core at a constant angle with respect to the core axis. The angle of lay would depend upon the speed with which the core is advancing upwardly through the former 41. This conventional structure is not suitable when it is desired to apply a braid around a splice, designated by the numeral 42, formed between two cables 45 and 46. Such a splice may be made by twisting the conductors at the trailing end of the upper cable 45 to the conductors at the leading end of the lower cable 46.

When splicing two cables together, it is a common practice to apply an insulating material, such as an insulating tape, around the splice. Such an insulated splice is depicted at 42. If tension is then applied to the integral cable formed by splicing the two cables together, there will be a tendency to pull the spliced conductors apart or the splice will form a weak and potentially inferior section of the integral cable. The purpose of this invention is to strengthen the spliced cables 45 and 46 by applying a variable lay braid around the cables so that the braid will grip the cables firmly on each side of the splice but will not grip the splice. This will cause any tension in the integral cable to be taken up by the braided strands around the splice and not by the splice itself so that the splice will not be weakened.

To apply a variable lay braid around the splice 42 between the cables 45 and 46, a special capstan 47 (Fig. 1) is provided, which has a spiral groove 50 therearound and a larger diameter near the center than at the ends thereof. The capstan 47 is secured to a horizontal shaft 51 mounted rotatably within bearings 52—52 secured to the upper ends of two standards 54—54. The capstan 47 is rotated by the motor 27 through a vertical shaft 55, a worm 56, a worm gear 57 and a clutch 60 at a predetermined speed less than the speed of rotation of the driving gears 22—22. The shaft 51 may be disconnected from the worm gear 56 and the motor 27 by actuating a lever 61 in a counterclockwise direction, as viewed in Fig. 1, to disengage the clutch 60.

Two horizontal bars 62 and 65 are secured between the standards 54—54, and a vertical guideway 66 is secured fixedly, such as by welding, to the horizontal bars. A jaw 67 (Fig. 3) of a clamp 70 is mounted slidably on the guideway 66 for vertical movement between a stop 71 secured to the lower end of the guideway 66 and a microswitch 72 (Fig. 1) secured to the upper end of the guideway. When contacted by a stud 75 secured to the jaw 67, the microswitch 72 is opened to open the circuit energizing the motor 27.

When the capstan 47 is rotated, the clamp 70 is moved from its lower position to its upper position by a flexible chain 76. One end of the chain 76 is secured to the capstan 47 by a pin 77 and the other end of the chain is secured to the upper side of the jaw 67 by a screw eye 80. A movable jaw 81 (Figs. 3 and 4) is mounted pivotally to the jaw 67 of the clamp 70, and the upper cable 45 can be secured fixedly between the jaws 67 and 81 by rotating a conventional wing nut 82 which is threaded to a bolt 85 secured pivotally to the jaw 67.

If it is desired to apply a braid to the spliced cables without running the whole lengths of the cables through the braiding machine, it may be convenient to use a machine that will open to receive the cables at any point along the lengths thereof. Such a machine, which is available commercially, is shown diagrammatically in the drawings. In Fig. 3, for example, the upper plate 12 and the lower plate 10 are shown in two sections, which are hinged by a pin 86 and are capable of being opened along lines 87 and 90. As shown in Fig. 3, the three quoits 17—17 and gears 22—22 on the left will move with the left-hand pivoted sections of the plates 10 and 12 so that the cables 45 and 46 with the splice 42 therebetween can be inserted within the central apertures 15—15 in the plates. For this same reason, the ring-shaped former 41 described hereinabove is hinged and capable of being opened along a diameter thereof.

The relationship of the gears 22—22 is critical and determines the locations of the carriers 32—32 and 35—35. In turn, the positions of the carriers are critical because the locations of the bobbins 37—37 and 40—40 and the forming of the braid around the spliced cables 45 and 46 are determined thereby. Consequently, to maintain the original positions of the gears 22—22 when the plates 10 and 12 are opened to introduce the spliced cables 45 and 46 into the central apertures 15—15 thereof, a lever 92 is provided (Fig. 3). The lever 92 is mounted pivotally by a pin 93 to the hinged section of the lower plate 10. When the lever 92 is rotated in a clockwise direction, the end of the lever is inserted between two teeth of one of the gears 22—22. If the hinge pin 86 is positioned close to the point where two other gears 22—22 mesh so that they will not disengage, then the hinged sections of the upper plate 12 and the lower plate 10 can be parted while maintaining the original relationship of all of the driving gears 22—22 in the gear train.

*Operation*

After the trailing end of the cable 45 has been spliced to the leading end of the cable 46, the splice 42 is moved to the position shown in Fig. 4. This is accomplished by parting the two sections of the lower plate 10 and the upper plate 12, while maintaining the original positions of the driving gears 22—22 by engaging the lever 92 with one of such gears. The former 41 is also opened and the cable 45 is placed in the center thereof. The cable 45 is secured fixedly between the jaws 67 and 81 of the clamp 70 by tightening the wing nut 82 on the bolt 85. At this time the clamp 70 is resting on the stop 71, as shown in Fig. 4. As shown there, a strand from each of the bobbins 37—37 and 40—40 is secured around the periphery of the upper cable 45 by a flat metal band 91 with the splice 42 a predetermined distance below the band. The cables are now in the correct position to apply a variable-lay braid therearound.

With the clutch 60 engaged to connect the shaft 51 to the worm gear 57, the motor 27 is energized. Energization of the motor 27 causes the capstan 47 to rotate at a constant speed and the bobbins 37—37 and 40—40 to revolve in opposite directions around the axis of the spliced cables 45 and 46. Since the capstan 47 is secured to the clamp 70 by the chain 76, it advances the cables 45 and 46 and the splice 42 through the former 41, and the strands from the bobbins 37—37 and 40—40 will be laid around the cables and the splice in the form of a braid. If the capstan 47 should advance the cables at a constant speed, a conventional braid would be applied around the cables. However, as the chain 76 is wound within the spiral groove 50 on the capstan 47, and approaches the larger diameter of the capstan at the center thereof, the speed at which the chain 76 is pulling the clamp 70 upwardly and, hence, the speed at which the cables 45 and 46 and the splice 42 are advancing, is increased.

This increase in speed of the cables 45 and 46 causes the angle (measured with respect to the axis of the cables) at which the strands are laid upon the cables to be smaller than that resulting when the chain 76 is wound within the groove 50 at the smaller diameters at the ends of the capstan 47. The various parts are so designed and the speeds of the cables 45 and 46 and the bobbins 37—37 and 40—40 are such that a braid is formed that grips the cables 45 and 46 firmly on either side of the splice 42. However, due to the smaller angle of lay of the braid applied over the splice 42, no gripping occurs in this area.

When the clamp 70 approaches the position shown in Fig. 5, the stud 75 contacts and opens the microswitch 72 to de-energize the motor 27. This stops the capstan 47 from rotating and the bobbins 37—37 and 40—40 from revolving about the cables 45 and 46. After the motor 27 has stopped, a metal band 92 (Fig. 5), similar to the band 91, is placed around the cable 46 to secure the strands from the bobbins thereto. The strands below the band 92 are then severed and the clamp 70 is opened to release the cable 45. The hinged sections of the plates 10 and 12 and the hinged former 41 are opened to withdraw the covered spliced cables 45 and 46 from the machine. The clutch 60 is then disengaged, and the clamp 70 is returned to its original position abutting the stop 71 as shown in Fig. 4.

Referring again to Fig. 5, the resultant product will have a variable-lay braid formed around the spliced cables 45 and 46 such that the braided strands grip the cable 45 between the points A and B. The cable 46 will be gripped similarly between the points C and D. However, due to the braids having a smaller angle of lay between the points B and C, between which points the splice 42 is located, there is no gripping between these points. Consequently, any tension that is applied to the spliced cables 45 and 46 is taken up by the braided strands around the splice 42 and not by the splice itself. Also, any elongation of the cables 45 and 46 will elongate the gripping portions of the braid and cause the cables to be gripped more tightly by the braid.

While the apparatus embodying the invention has been described for applying a variable-lay braid around spliced cables, it could be used to cover any core with such a braid, and it is manifest that various modifications of this invention may be made without departing from the spirit and scope thereof.

What is claimed is:

1. A core covering apparatus which comprises a plurality of strand supplies, means for revolving the strand supplies around a core to lay the strands therearound in the form of a braid at an angle with respect to the axis of the core, and means for advancing the core at variable speed ratios with respect to any speed of said revolving means to vary the angle at which the strands are laid around the core.

2. In a braiding machine for covering a core with a braid formed of stranded material wherein a plurality of strand supplies are revolved around an advancing core to form a braid thereover, the improvement which comprises means for advancing the core at variable speed ratios with respect to any speed of said revolving means to vary the angle of lay of the strands in the braid.

3. A core covering apparatus which comprises a base, a plurality of strand supply reels mounted movably on the base, means for guiding a core along a path adjacent to the reels, means for revolving the reels around the core to form a braid therearound, and means for advancing the core at variable speed ratios with respect to any speed of said revolving means to vary the angle of lay of the strands in the braid around the core.

4. A core covering apparatus which comprises a base, a plurality of strand supply spools mounted movably on the base, a guideway secured to the base, clamping means mounted slidably upon the guideway for securing a predetermined length of a core and a strand from each spool against relative movement, means for revolving the spools around the core to form the strands into a braid therearound, and means for advancing the clamping means at variable speeds to vary the angle of lay of the strands in the braid.

5. A core covering apparatus which comprises a base, a plurality of strand supply spools mounted movably on the base, a guide bar secured to the base, a clamping member mounted slidably on the guide bar and designed to secure the core and a strand from each spool in spaced relation, means for revolving predetermined numbers of the spools in different paths and directions about the core such that a braided covering is formed therearound, and a capstan connected to the clamping member for advancing the clamping member at variable speeds to vary the angle at which the strands are laid around the core.

6. Apparatus for covering a splice between electrical conductors, which comprises a base, a plurality of strand supply spools mounted movably on the base, means for guiding a core along a path adjacent to the spool, means for directing a strand from each spool toward the advancing core, means for revolving the spools around the core such that the strands contact the spliced conductors and form a braided covering therearound, and means for advancing the spliced conductors at a predetermined speed when the strands are being applied to the conductors on either side of the splice and at greater than the predetermined speed when the strands are being applied around the splice.

7. In a braiding machine of the type wherein a plurality of strand supply reels are mounted slidably on a base, a core of indefinite length is advanced along a path adjacent to the reels and the reels are revolved in two different paths and in opposite directions about the axis of the core to form the strands into a braided covering on the core, the improvement for cores having a splice positioned along the length thereof, which comprises a clamp mounted slidably on the base for securing the core near the splice, means for securing a strand from each reel to the periphery of the core, a capstan mounted rotatably to the base and having a spiral groove formed along the periphery thereof with the diameter of the groove being greater near the center of the capstan than the diameters near the ends thereof, a flexible cable secured between the capstan and the clamp and designed to be wound within the groove in the capstan when the capstan is rotated, means for rotating the capstan at a predetermined speed slower than the speed at which the reels are revolving about the axis of the spliced core, the core being so secured by the clamp that the cable is received in the larger diameter portion of the groove in the capstan when the braid is being applied to the splice, thereby advancing the clamp and the core faster when the braid is being applied to the splice to cause the angle of lay of the braid around the splice to be smaller than the angles of lay of the braid around the core on either side of the splice.

8. Apparatus for covering spliced conductors, which comprises upper and lower base plates, a plurality of strand supply reels mounted slidably upon the upper base plate, a vertical guide secured to and positioned above the base plates, a former secured to the lower end of the guide through which the spliced conductors and a strand from each reel are directed, a clamp mounted slidably to the vertical guide above the former and designed to clamp the conductors above the splice, means for securing the strands to the conductors in spaced relation between the clamp and the former, gearing means positioned between the upper and lower plates and designed to revolve a predetermined number of the reels about the spliced conductors in one path and one direction and a like number of the reels in a different path and an opposite direction such that the strands are laid around the conductors in the form of a braid, a capstan mounted rotatably to the base above the guide and having a spiral groove thereon of varying diameter with the diameter near the center portion being greater than the diameters near the ends thereof, a flexible cable connected between the vertically-movable clamp and the capstan and designed to be received in the spiral groove in the capstan when the capstan is rotated, and a motor for rotating the gearing means at a predetermined speed and for rotating the capstan at a speed that is less than the predetermined speed, the center portion of the capstan causing the cable to advance the clamp and the spliced conductors secured therein faster when the braid is being applied around the splice than when the braid is being applied around the conductors to form a variable-lay braid that will grip the conductors firmly on either side of the splice.

References Cited in the file of this patent
UNITED STATES PATENTS

| | | |
|---|---|---|
| 1,358,173 | Penso | Nov. 9, 1920 |
| 1,486,166 | Standish | Mar. 11, 1924 |